US011403697B1

(12) United States Patent
Wu et al.

(10) Patent No.: US 11,403,697 B1
(45) Date of Patent: Aug. 2, 2022

(54) THREE-DIMENSIONAL OBJECT IDENTIFICATION USING TWO-DIMENSIONAL IMAGE DATA

(71) Applicant: A9.com, Inc., Palo Alto, CA (US)

(72) Inventors: Hao-Yu Wu, Sunnyvale, CA (US); Mehmet Nejat Tek, Santa Clara, CA (US); Ke Zhang, Los Angeles, CA (US)

(73) Assignee: A9.com, Inc., Palo Alto, CA (US)

( * ) Notice: Subject to any disclaimer, the term of this patent is extended or adjusted under 35 U.S.C. 154(b) by 384 days.

(21) Appl. No.: 15/890,964

(22) Filed: Feb. 7, 2018

(51) Int. Cl.
*G06Q 30/00* (2012.01)
*G06Q 30/06* (2012.01)
*G06F 3/04812* (2022.01)
*G06F 3/0482* (2013.01)
*G06F 16/951* (2019.01)

(52) U.S. Cl.
CPC ....... *G06Q 30/0643* (2013.01); *G06F 3/0482* (2013.01); *G06F 3/04812* (2013.01); *G06F 16/951* (2019.01)

(58) Field of Classification Search
CPC ............ G06Q 30/0601–0645; G06Q 30/0643; G06F 16/951; G06F 3/04812; G06F 3/0482
USPC .................................................. 705/26–27.2
See application file for complete search history.

(56) References Cited

U.S. PATENT DOCUMENTS

| | | | |
|---|---|---|---|
| 9,424,461 B1* | 8/2016 | Yuan | G06K 9/00214 |
| 2017/0236183 A1* | 8/2017 | Klein | G06N 3/0454 |
| | | | 705/26.7 |
| 2019/0220694 A1* | 7/2019 | Biswas | G06K 9/6202 |

OTHER PUBLICATIONS

Ryan George Rosandich Artificial Vision: Three-dimensional object recognition using neural networks, University of Missouri (Year: 1994).*

* cited by examiner

*Primary Examiner* — Kathleen Palavecino
(74) *Attorney, Agent, or Firm* — Hogan Lovells US LLP

(57) ABSTRACT

Various approaches provide for visual similarity-based search techniques that allow a user to provide two-dimensional image data (e.g., still images or video) about an item and search for items having related three-dimensional features. In order to create an electronic catalog of items that is searchable by three-dimensional features, the features are extracted from image data for each item. The three-dimensional features can be extracted using a trained model, such as a trained neural network or other machine learning-based approach. Thus, three-dimensional features of items in the electronic catalog can be determined and used to select or rank the items in response to a visual search query based on determined three-dimensional features of the query item. For example, three-dimensional features of the query item can be used to query the electronic catalog of items, in which items having visual attributes of similar three-dimensional features are selected and returned as search results.

18 Claims, 7 Drawing Sheets

THREE-DIMENSIONAL OBJECT IDENTIFICATION USING TWO-DIMENSIONAL IMAGE DATA

BACKGROUND

With the expanding use of computer networks, such as the Internet, an increasing amount of commerce is conducted electronically. For example, consumers are increasingly utilizing electronic marketplaces to purchase various items such as household items, clothing items, apparel items, and the like. Countless items are for sale online, and being able to search quickly and efficiently for an item is increasingly important, not only for online retailers who wish to sell their products, but for consumers who are looking to find a specific item quickly. Generally, users often rely upon search queries or keyword strings that can be used to identify potentially relevant content. In many instances, however, the relevance depends at least in part to the actual query that was submitted, as well as the way in which the potentially relevant content is categorized or identified. There often is no easy way for a user to modify a query to express a desired refinement, and no accurate way for that expression to be implemented so as to locate the content of interest. This is particularly true for certain visual attributes that are difficult to quantify through existing keyword-based approaches. In another example, a user interested in acquiring information about an object can capture an image of the object and submit the captured image to an object recognition service to obtain information associated with the object. However, conventional object recognition services may have difficulty in quickly and efficiently recognizing objects. As such, the user may not obtain the desired information, which can be potentially frustrating.

BRIEF DESCRIPTION OF THE DRAWINGS

Various embodiments in accordance with the present disclosure will be described with reference to the drawings, in which.

DETAILED DESCRIPTION

Figure 1A:
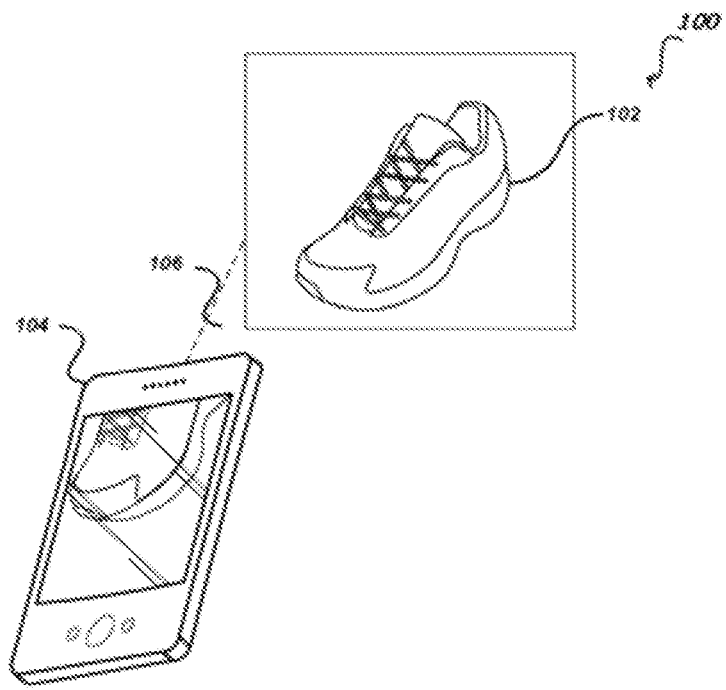
FIGS. 1A and 1B illustrate an example computing device that can be utilized for visual searches in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to identifying various types of items using an electronic device. In particular, various embodiments allows a user to capture image data (e.g., still images or video) about an item such as a clothing item and search for items having similar visual features to the item. For example, in at least some embodiments, an electronic device (e.g., a mobile phone, a tablet computer, etc.) can communicate with at least one image analysis service in order to attempt to determine visually similar items to the item represented in the image data (although in some embodiments at least a portion of the matching can be done on the computing device itself). In an embodiment, the device can capture one or more images, such as image frames for a live video feed of an item such a shoe, clothing item, or other such item, and can upload, stream, or otherwise transfer the images (e.g., the captured image or data resulting from processing the image), either automatically or in response to user action, which can direct at least a portion of the image data to one or more image analysis services (or devices, or modules, etc.). In an embodiment, the images can represent various viewpoints of the item and can include various products including two and three-dimensional products.

An image analysis service can, for example, process the images using a trained neural network or other such trained model to determine three-dimensional features from the query images. The determined three-dimensional features can be used to search a database for visually similar items. For example, the database can include an electronic catalog of items offered through an electronic marketplace. The items can be associated with respective three-dimensional features. The three-dimensional features from the query image can be compared to the stored three-dimensional features that correspond to the items offered through the electronic marketplace. Based on the comparison, results can be aggregated and information for the results can be presented as a set of matches or results in response to, for example, a visual search query. Approaches can also utilize one or more information aggregators or other such services that are capable of obtaining additional information for each of the results and provide that information to the user. The additional information can include, for example, descriptions, contact information, availability, location data, pricing information, and other such information.

In order to create an electronic catalog of items that is searchable using three-dimensional features, the three-dimensional features of each item in the electronic catalog are identified and extracted from the image data of each item. For example, the electronic catalog of items may include image data, text descriptions, and other metadata associated with individual items in the electronic catalog. The items can be associated with a category including, for example, clothing, sofas, shoes, etc. A model can be trained to identify three-dimensional features for items belonging to a particular category. The trained model can be used to process images of the items in the electronic catalog to generate three-dimensional features representing the items in the catalog. The model can be trained using three-dimensional representation data for an item in a category and images of various viewpoints of items in the category. The model and/or various models can be trained for various categories of items. Thereafter, a trained model can be used to process one or more images for various viewpoints of an item to extract three-dimensional features of the item. Thus, three-dimensional features of items in the electronic catalog can be determined and used to select or rank the items in response to a search query that includes a query image.

For example, to conduct a search using three-dimensional features, a user may submit a search query that includes at least one image. The image(s) can be processed using a trained model to determine three-dimensional features associated with an item represented in the image(s). The three-dimensional features can be used to query an electronic catalog of items associated with respective three-dimensional features. Items having three-dimensional features of similar feature values are selected and returned as search results. In some embodiments, the items may be ranked based on similarity scores, which may be weighed according to a weighting function.

Various other features and applications can be implemented based on, and thus practice, the above described technology and presently disclosed techniques. Accordingly, approaches in accordance with various embodiments improve the operation and performance of the computing device(s) on which they are implemented by enabling the computing systems to generate precision data (e.g., three-dimensional features) using computer vision and processing approaches, and utilize such data to produce search results. Conventionally, search systems rely on user-defined labels to filter for items. For example, a user may label a certain item in an electronic catalog as have the color attribute value "red", the neckline attribute value of "crew neck", etc. This operation and performance of computing systems under such techniques are fundamentally limited to the amount and particular structure of user-provided data. In contrast, the present techniques enable computing system to generate additional data regarding an item (e.g., three-dimensional features), beyond user-provided labels, and even beyond what can be accurately described by human annotators or through human language. Machine generated precision data such as feature vectors can represent image data in ways no human can possibly generate, and can only be extracted using computing devices, and more specifically computing devices specially equipped with machine learning capabilities. Additionally, not only are computing devices indispensable to the generation of precision data such as feature vectors, but such data is also only readable by and meaningful to computing devices. Thus, the systems and methods described herein are fundamentally tied to computing machines and provide improvements to computing technology. Various other applications, processes, and uses are presented below with respect to the various embodiments, each of which improves the operation and performance of the computing device(s) on which they are implemented.

FIG. 1A illustrates an example 100 of capturing an image of a shoe 102 that can be utilized in accordance with various embodiments. In this example, a user is interested in obtaining information about the shoe. The shoe is shown with a particular orientation, as may be used by an electronic retailer or other such provider to display objects in an electronic marketplace. Such an orientation also can be used for matching, as the perspective view provides information about the general shape of the object, and shows the side and tongue of the shoe, which are likely places for any logo or distinctive markings. Using an appropriate application executing on a computing device 104, the user is able to obtain an image of the shoe by positioning the computing device such that the shoe is within a field of view 106 of at least one camera of the computing device. In this example, although a mobile computing device is shown in this example, it should be understood that various other types of electronic device that are capable of determining and processing input can be used in accordance with various embodiments discussed herein. These devices can include, for example, cameras, smartphones, e-book readers, desktop computers, notebook computers, personal data assistants, video gaming consoles or controllers, smart televisions, portable media players, and wearable computers (e.g., glasses, watches, etc.), among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree. Additionally, in many situations, the electronic marketplace may provide a search interface that enables a user to search for a desired item. The search interface may return search results based on relevance of particular items to the customer's search query. The search query can include one or more keywords, and the search results can be determined based on the keywords. The user can scroll or otherwise navigate through the results to determine whether any of the results are of interest to the user. It might be the case, however, that there were too many results returned and the user is not finding items of interest in an initial subset of the results. Accordingly, the user might want to narrow the query in order to obtain search results that are more relevant or of interest to the user based on the user's current interest. However, even with a search interface in place, it can be difficult for customers to find relevant items. For example, unless the user knows an exact brand or style of an item that the user wants, or the appropriate search terms, the user might have to search through hundreds or thousands of different items using various options to attempt to locate the type of item in which the user is interested. If the user is interested in an item of a specific type, the user might have to sift through many or all of these results, potentially only being able to narrow the results by price, ratings, availability, or other such options. Some other options can be utilized, such as wayfinding options, that can assist users in navigating through a long set of results from a vague or open-ended query. As long as there is a well-defined similarity function between items, such as may relate to the similarity defined by the 3D features, users can be assisted in navigating more quickly to their target item.

Some providers allow a user to submit a search query that includes an image. Conventional approaches are generally derived from local invariant image features and bag-of-word mode. Such approaches generally consist of two stages. In a first stage, query images are decomposed into collections of local features, encoded into visual words, and the visual words are used to generate a list of candidates. In a second stage, list of the candidates can be geometrically verified (e.g., using RANSAC) and re-ranked to improve search quality. However, such approaches tend to bias toward retrieving images with similar color and patterns, and disregard the three-dimensional shapes or pose of the items. As such, text-based searching using keywords or natural language queries can be difficult methods for a user to find a particular product, even when combined with visual image searching functionality.

Accordingly, approaches in accordance with various embodiments allow users to search for similar items in an electronic catalog based on three-dimensional features of those items. For example, an image analysis service can obtain and analyze multiple images of the shoe to be matched, which could include images taken from the top, bottom, each side, and various angles with respect to an object, as well as differently shaped states of the object (where possible). The images can be obtained using various approaches. For example, the portion of the image to be analyzed can be indicated manually, such as by a user pointing to the shoe on the screen or drawing a bounding box around the shoe. In other embodiments, one or more image analysis algorithms can attempt to automatically locate one or more objects in an image. In some embodiments, a user can manually cause the image to be analyzed, while in other embodiments the image can be analyzed automatically, either on the device or by transferring image information to a remote system or image analysis service as discussed later herein.

Figure 1B:
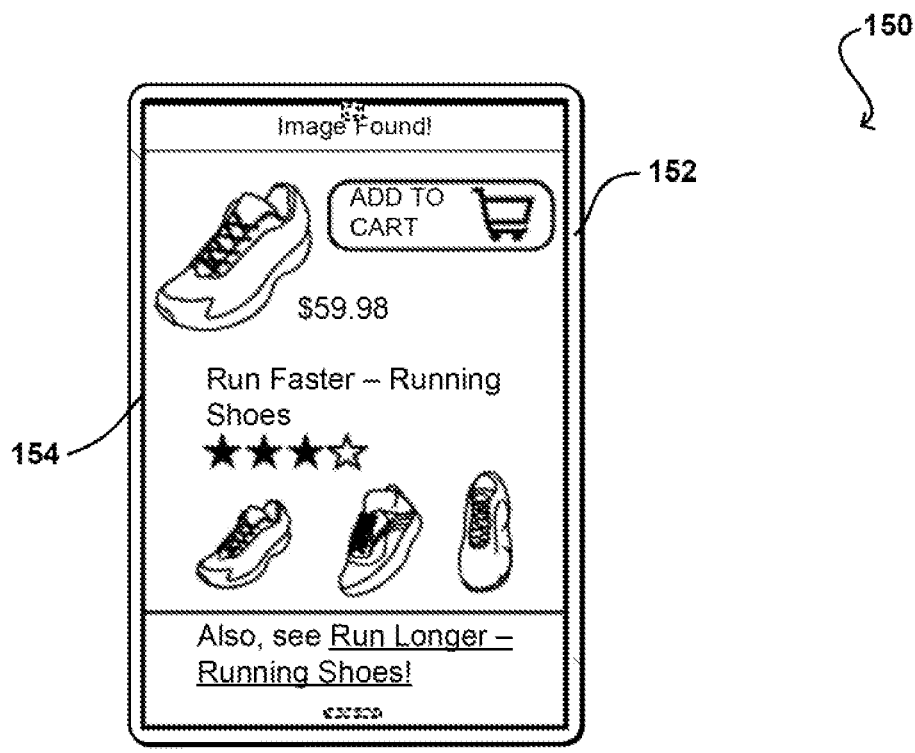

An image analysis service can, for example, process the images using a trained neural network to determine three-dimensional features from the query images. The determined three-dimensional features can be used to search a database for visually similar items that can be associated with respective three-dimensional features. For example, the three-dimensional features from the query image can be compared to the stored three-dimensional features that correspond to the items stored in the database. Based on the comparison, results can be aggregated and information for the results can be presented as a set of matches or results in response to, for example, a visual search query. For example, as illustrated in example 150 of FIG. 1B, the device 152 displays the matched object to the user and in various embodiments, information associated with the object. The associated information can include any information related to an object, item, product, or other element that is matched (within at least a level of confidence) to the image information. The displayed information 154 in this example includes the name of the located shoe, an image of the shoe (as captured by the user or otherwise obtained), pricing and description information, and review information. Also as shown are options to purchase the shoe.

In accordance with an embodiment, the type of information 154 displayed (or otherwise conveyed) can depend at least in part upon the type of content located or matched. For example, a located shoe might include shoe type and additional images. For facial recognition, the information might include name, title, and contact information. It should be noted that images of any object, scene, person, or otherwise can be acquired, and information related to the subject of the acquired image can be provided. Examples situations in which such information can be provided include, but are not limited to, shopping, exploring, data collecting, where a user captures information about an object and is provided information related to the object; traveling, where a user captures an image of a monument, building, statute, landscape, etc. and is provided information related to the captured image, working, where a user captures an image of a part, component, or tool and is provided information related to the captured image; exploring, where a user captures an image of food, locations and is provided information related to the captured image, among others.

Figure 2:
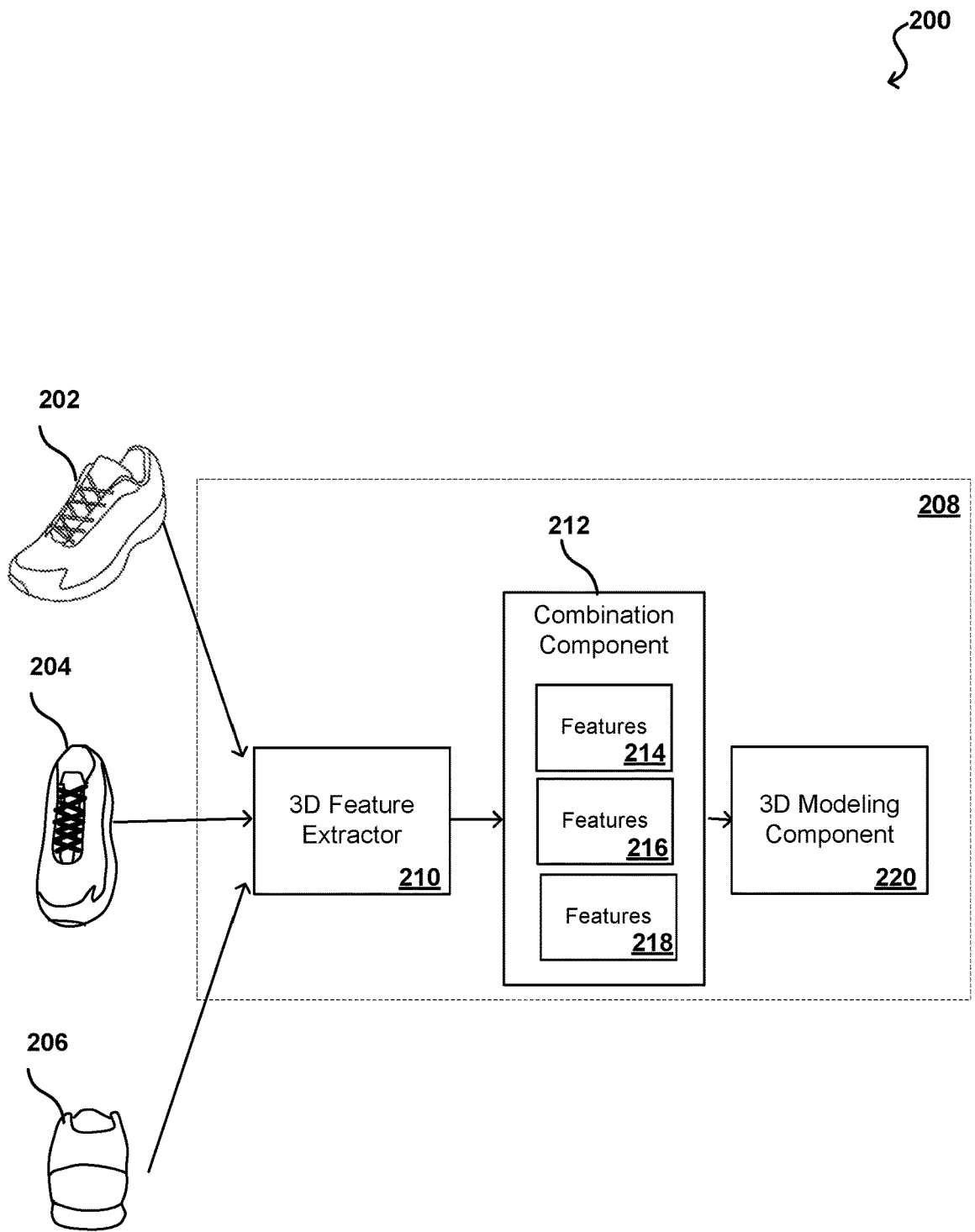
FIG. 2 illustrates an example environment that includes a feature extraction system that can be utilized for visual searches in accordance with various embodiments of the present disclosure.

FIG. 2 illustrates an example 200 of an environment that includes a system in accordance with various embodiments of the present disclosure. As shown in FIG. 2, images 202, 204, and 206 of an item are received at a three-dimensional feature extractor 210. The images can each include a representation of an item, where those representations can be taken from different angles, zoom levels, or ambient lighting conditions, among other such options. In this example, the item being represented is a shoe. Each representation of the item in this example is from a different viewpoint. The three-dimensional feature extractor 210 can be associated with an environment 208, such as a content or service provider environment, that also includes at least one combination component 212 and three-dimensional modeling component 220. It should be understood that there may be multiple instances of each utilized for the same or different purposes within the scope of the various embodiments. The service provider may provide an offering such as an electronic marketplace. The feature extraction process can be utilized to provide content in response to a search, such as a visual search. The three-dimensional feature extractor 210 and three-dimensional modeling 220 components can include trained neural networks and/or classifiers of such neural networks. For example, the three-dimensional feature extractors can include three-dimensional reconstruction convolution neural networks operable to generate three-dimensional geometry-aware image features. The three-dimensional modeling component 210 can process three-dimensional features to generate a three-dimensional representation of the item. Combination components can combine three-dimensional feature vectors generated from the three-dimensional feature extractor 210. In various embodiments, the resulting three-dimensional features 214, 216, 218 can be compressed for improved processing. For example, the three-dimensional features may include a large number of dimensions. The dimensions of these three-dimensional features can be reduced by applying at least one of Linear Discriminant Analysis (LDA), Principal Component Analysis (PCA), or Multi-Dimensional Scaling (MDS).

It should be noted that additional or alternative elements can be used in such a system in accordance with the various embodiments. Accordingly, it should be noted that additional services, providers, and/or elements can be included in such a system, and although some of the services, providers, elements, etc. are illustrated as being separate entities and/or elements, the illustrated arrangement is provided as an example arrangement and other arrangements as known to one skilled in the art are contemplated by the embodiments described herein.

In this example, the three-dimensional feature extractor 210 can process a query image 202 to determine three-dimensional features 214, as may comprise a feature vector.

Additional images 204, 206 of the item can be processed by the three-dimensional feature extractor 210 as well to determine additional features 216, 218 for those respective viewpoints. A combination component 212 can combine the three-dimensional features 214, 216, 218 into an aggregate three-dimensional feature vector, or other set or grouping of three-dimensional features for the item. In an embodiment, the combination component 212 can include a three-dimensional convolutional long short-term memory network to combine the three-dimensional features from multiple viewpoints into a single representation. Thus, the aggregate three-dimensional feature vector can include three-dimensional features from multiple viewpoints of the item. As described, the determined three-dimensional features can be used to search a database for visually similar items. For example, the database can include an electronic catalog of items offered through an electronic marketplace. The items can be associated with respective three-dimensional features. The three-dimensional features from the query image(s) can be compared to the stored three-dimensional features that correspond to the items offered through the electronic marketplace. Based on the comparison, results can be aggregated and information for the results can be presented as a set of matches or results in response to, for example, a visual search query.

In various embodiments, the three-dimensional feature extractor (e.g., 210) may include a convolutional neural network (CNN). The CNN may be trained to extract three-dimensional features from two-dimensional images of items. As will be described further herein, the neural networks can be trained using three-dimensional representation information for an item in a category and images of various viewpoints of items in the category. In certain embodiments, training a neural network may involve significant use of computation resources and time, such that this may correspond to a preparatory step to servicing search requests and/or performed relatively infrequently with respect to search request servicing and/or according to a schedule. In various embodiments, the resulting three-dimensional feature vectors can be compressed for improved processing. For example, the three-dimensional feature vectors generated by the neural network may include three-dimensional feature vectors that have a large number of dimensions. The dimensions of these object feature vectors can be reduced by applying at least one of Linear Discriminant Analysis (LDA), Principal Element Analysis (PCA), or Multi-Dimensional Scaling (MDS). Advantageously, such an approach can reduce storage demands and significantly improve latency performance.

The neural network may be further trained or refined by generating a three-dimensional representation of the item using a three-dimensional modeling component, for example, three-dimensional modeling component 220, and comparing the three-dimensional representation to a reference three-dimensional representation of the item. In an embodiment, the reference three-dimensional representation may be determined in a highly controlled environment, and include a highly accurate and detailed three-dimensional representation of the item. Comparing the three-dimensional representation to the reference three-dimensional representation can result in a similarity score, where the similarity score is a measure of visually similarity between the three-dimensional representations. The similarity score can be compared to a threshold, for example, a threshold similarity score. In the situation where the similarity score satisfies the threshold, the neural network may receive validation that the generated three-dimensional features are within an acceptable level. In an embodiment, a validation score can be assigned to the three-dimensional feature exactor, in which the value of the validation score depends on the relationship between the three-dimensional representation, generated from the three-dimensional features, and a reference three-dimensional representation of the item. In some embodiments, the neural network may be designed to maximize or minimize the validation score. In certain such embodiments, the validation score may include a penalty score given when the neural network provides three-dimensional features that do not result in a satisfactory three-dimensional representation or a three-dimensional representation that does not satisfy a threshold level of similarity to a reference three-dimensional representation. In such an example, the neural network may be designed to minimize penalty scores.

The various components 210, 212, 220 may be implemented on one or more physical server computing devices that provide computing services and resources to users. In some embodiments, the components may be implemented on one or more host devices, such as blade servers, midrange computing devices, mainframe computers, desktop computers, or any other computing device configured to provide computing services and resources. For example, a single host device may execute one or more content servers, one or more group generators, various data stores, some combination thereof, etc. The system may include any number of such hosts.

In some embodiments, the features and services provided by a feature extraction system may be implemented as web services consumable via a communication network. In further embodiments, the system (or individual elements thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

Figure 3:
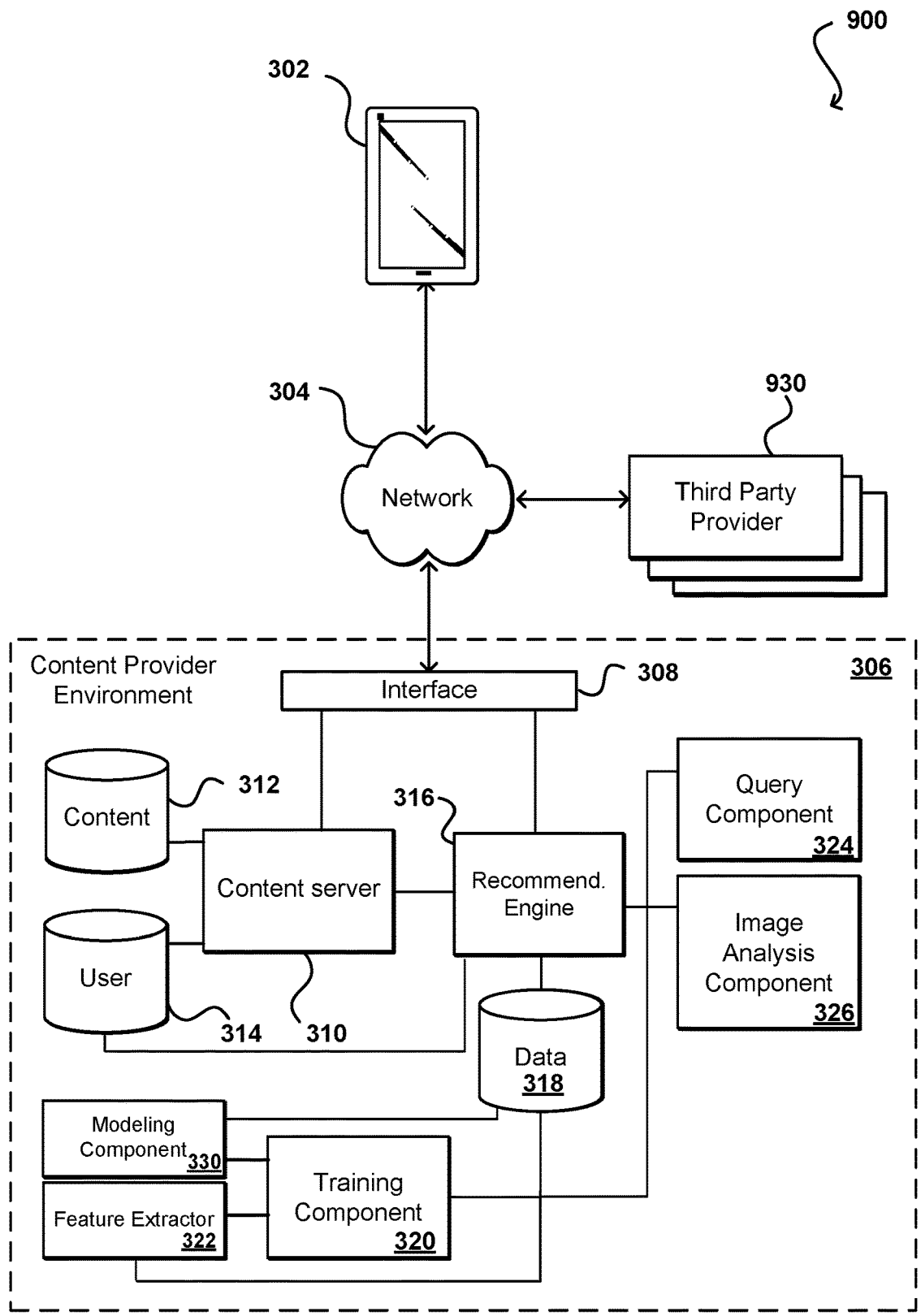
FIG. 3 illustrates an example environment in which aspects of the various embodiments can be implemented in accordance with various embodiments of the present disclosure.

FIG. 3 illustrates an example environment 300 in which aspects of the various embodiments can be implemented. In this example, a computing device 302 is able to make a call or request across one or more networks 304 to a content provider environment 306 (also referred to as a service provider) that includes a system such as the feature extraction system discussed with respect to FIG. 2. Individual computing devices 302 may be any of a wide variety of computing devices, including personal computing devices, terminal computing devices, laptop computing devices, tablet computing devices, electronic reader devices, wearable computing devices, mobile devices (e.g., smartphones, cameras, media players, handheld gaming devices, etc.), and various other electronic devices and appliances. A user may operate a user device to access and interact with content managed by the content provider. In some embodiments, a user may launch specialized application software, such as a mobile application executing on a particular user device, such as a smartphone or tablet computer. The application may be specifically designed to interface with the system for accessing and interacting with content. In some embodiments, a user may use other application software, such as a browser application, to interact with the content provider.

In this example, the computing device 302 can submit a visual search query for content from the service provider via one or more networks 304. The network(s) can include any appropriate network, such as the Internet, a local area network (LAN), a cellular network, an Ethernet, or other such wired and/or wireless network. The content provider environment 306 can include any appropriate resources for providing content from a resource provider, as may include various servers, data stores, and other such components known or used for providing content from across a network (or from the "cloud"). The request can be a visual search query and can include one or more images, such as image frames for a live video feed of an item. The request for a matching item can be received at, for example, a network interface layer 308. The network interface layer can include any appropriate elements known or used to receive requests from across a network, such as may include one or more application programming interfaces (APIs) or other such interfaces for receiving such requests. The network interface layer 308 might be owned and operated by the service provider, or leveraged by the service provider as part of a shared resource or "cloud" offering. The network interface layer can receive and analyze the requests from the computing device, and cause at least a portion of the information in the requests to be directed to an appropriate system or service of the system.

For example, the request can be directed to content server 310 of the system via the connection, which can obtain the content from a content data store 312 or other such repository to be sent back across the network(s) to the computing device. In some embodiments, information for the request might also be compared against user data in a user data store 314 or other such location do determine, for example, whether the user has access rights to that content. In some embodiments user data might also be analyzed to determine which type of content to provide, additional supplemental content to provide with the primary content, and the like. The content may include network resources such as Web pages, content posts, documents, images, videos, and the like. Illustratively, the content may be received as an individual piece of content (an individual Web page), as a set of results, or in some other format. A user of the computing device can interact with the content by activating links to other content, submitting search queries, initiating the purchase of items referenced in the content, etc. Information regarding user interactions with the content can be transmitted to the system for processing by content server 310. In addition, information regarding the interactions, or some subset thereof, may be stored for use in training and/or adjusting any appropriate machine learning approaches. For example, information regarding interactions may be stored in the data store 318.

As described, a user might want to capture two-dimensional image data (e.g., still images or video) of an item and search for items having similar visual features to the item. For example, when a request is received, the feature extractor 322, which can be similar to the 3D feature extractor 208 of FIG. 2, can, for example, process the query images using a trained neural network to determine three-dimensional features from the query images. The determined three-dimensional features can be used to search data store 318 for visually similar items. For example, the data store can include an electronic catalog of items offered through the content provider environment, such as an electronic marketplace. The items can be associated with respective three-dimensional features. The three-dimensional features from the query image can be compared to the stored three-dimensional features that correspond to the items offered through the electronic marketplace. Based on the comparison, information for the comparison can be fed to recommendation engine 316 which in this example includes the logic to determine the results. Thereafter, content server or other such appropriate component can cause information for the results to be presented as a set of matches or results in response to, for example, a visual search query. Approaches can also utilize one or more information aggregators or other such services that are capable of obtaining additional information for each of the results and provide that information to the user. The additional information can include, for example, descriptions, contact information, availability, location data, pricing information, and other such information.

The three-dimensional feature vectors can be determined at least in part using the feature extractor 322, such as those determined using convolutional neural networks or other such learning models, to determine the appropriate vectors through training on an appropriate data set. The training component 320 can perform the training on the models and provide the resulting results and/or trained models for use in determining the individual three-dimensional feature vectors. The training component 320 can be the same system or service that is used to train modeling component 330, as well as various neural networks or other models, networks, or algorithms discussed or suggested herein to process the three-dimensional features to generate a three-dimensional representation of items associated with the features.

In the example shown in FIG. 3, feature extractor 322 can include a neural network such as a convolutional neural network (CNN). Classifiers may be trained to identify feature descriptors (also referred herein as visual attributes) corresponding to visual aspects of an image. The feature descriptors can be combined into a feature vector of feature descriptors. In this example, a three-dimensional feature vector. Three-dimensional visual aspects of an item represented in an image can include, for example, a shape of the item. Visual attributes are features that make up the visual aspects of the item.

Feature extractor 322 can be trained using at least one three-dimensional representation and various viewpoints of items. An example process for training a neural network for generating three-dimensional features of an image begins with building a set of training images and three-dimensional representations. According to some embodiments, training images and representations can be located in a data store 318 that includes images of a number of different items.

In various embodiments, an electronic catalog of items may include image data, text descriptions, and other metadata associated with individual items in the electronic catalog. The items can be associated with a category including, for example, clothing, sofas, shoes, etc. Feature extractor 322 can extract three-dimensional features for items belonging to a particular category. The three-dimensional features can be stored in an appropriate data store, such as data store 312. In an embodiment, the process described above may be applied to all items in the electronic catalog such that the three-dimensional feature vectors for the items are stored in one or more databases and ready to be used to produce results in response to a visual search. In some embodiments, such a process may be performed on the fly in response to a search query. Thus, three-dimensional features of items in the electronic catalog can be determined and used to select or rank the items in response to a visual search query.

In accordance with various embodiments, CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer, along with a lower layer and an output layer, make up the network, such as a fully connected portion of the network in some embodiments. From the input layer, a number of output values can be determined from the output layer, which can include several items determined to be related to an input item, among other such options.

The query image in some embodiments may be received from client device 302 over network 304 and processed by query component 324. When a query image is received, for example, three-dimensional features may be obtained or determined for the query image. For example, the system may generate three-dimensional features for the query content in a same and/or similar manner that the three-dimensional features are generated for the collection of images, as described. Also, for example, if the query image is part of the collection then the three-dimensional features for the query image may be obtained from the appropriate data store. Using the three-dimensional features, visually similar images in content provider environment 306 can be identified.

Figure 4:
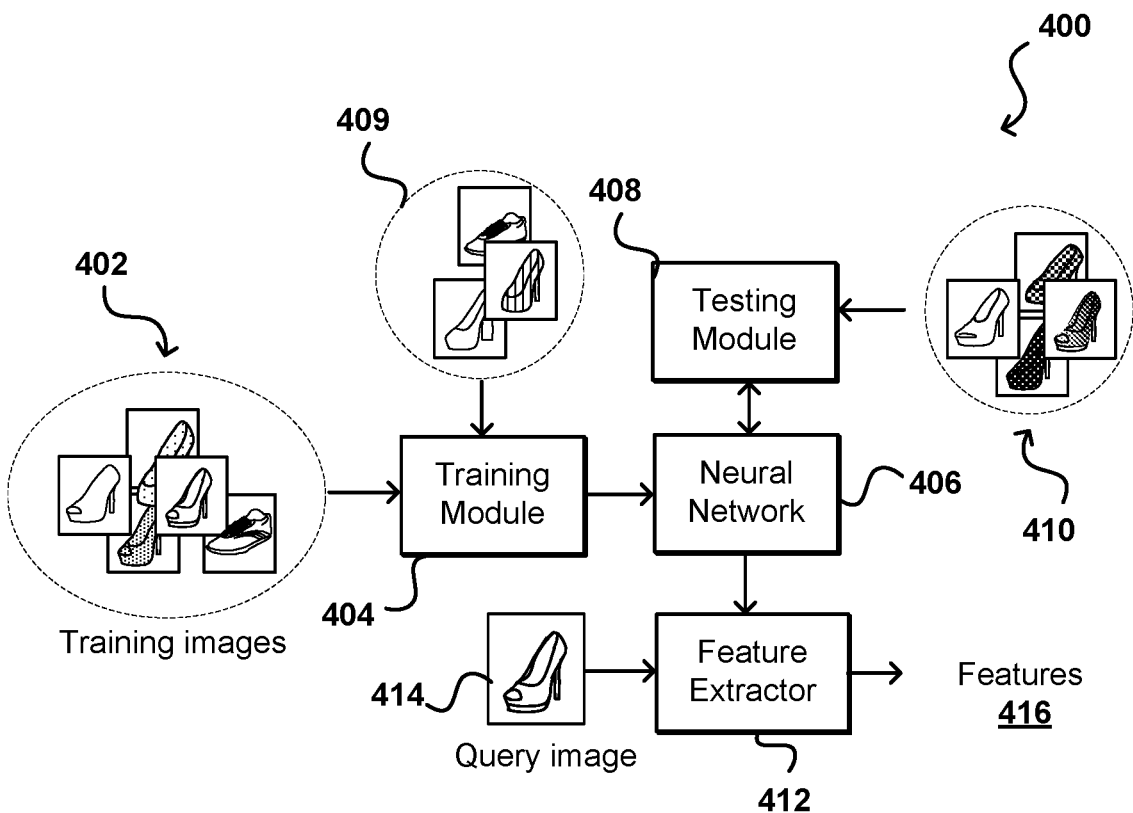
FIG. 4 illustrates an example approach for training a neural network that can be utilized for visual searches in accordance with various embodiments of the present disclosure.

FIG. 4 illustrates an example technique for training a model for a visually similarity search, in accordance with various embodiments of the present disclosure. In this example, a set of images 402 and reference detailed 3D models 409 are obtained that can be used to train one or more neural networks 406 to extract three-dimensional features from an image, or a set of images of the same item. These images can come from one or more sources, such as from a content provider, the Internet, an electronic catalog, or a social media site, and can include representations of various different types of items. In various embodiments, at least some of the images will include (or be associated with) data that indicates a category or classification of an item represented in each image. For example, an image showing a formal gown might include metadata such as "women's formal gown," or another such classification. This metadata can be used to filter out non-category items in at least some embodiments, but is otherwise not used for the training of the models.

In some embodiments the set of images will be analyzed to determine which images include data sufficient to identify a type of item represented in each of those images, and those images can be considered a training set to be used to train the neural networks. In at least some embodiments there is one neural network trained for each category of items. In this example, the training images and any corresponding item representations are accessible to a training module 404 which can feed the images to a neural network 406 in order to train the network. As mentioned, the image can be fed to the neural network so the neural network can learn features of items associated with different categories of items. The network can then learn various combinations or relations of features for different classifications, such that when a query image is processed with the trained neural network the network can extract three-dimensional features represented in the image, although various other approaches can be utilized as well within the scope of the various embodiments.

In some embodiments the training images 402 and reference models 409 are to be used as training data for a convolutional neural network or other deep neural network. As mentioned, the images can be classified to determine a primary classification or category, such as a woman's dress, shoe, barcodes, data matrices, etc. If provided by a user, information such as the keywords in the query or other information provided by the user can be used to classify and/or select the image for training. Various other images and models provided by third party sources can be used for training as well as discussed and suggested elsewhere herein. The neural network can be trained using some or all of the designated training data. Once at least the initial training has completed, a testing module 408 can utilize the testing images 410 to test the trained neural network.

The testing images can be associated with reference three-dimensional models. The three-dimensional features generated by the neural network can be compared against the reference three-dimensional models to determine the accuracy of the neural network, both overall and for different categories of items. The results can be analyzed and if the results are acceptable, such as where the accuracy at least meets a minimum accuracy threshold, the neural network can be provided to a feature extractor 412 that is able to accept query images 414 from various sources, such as customers or end users as well as any other relevant sources, and generate three-dimensional features for items represented in those images. The query images might also come from the provider itself, for use in an electronic catalog, quality control, or otherwise.

Figure 5:
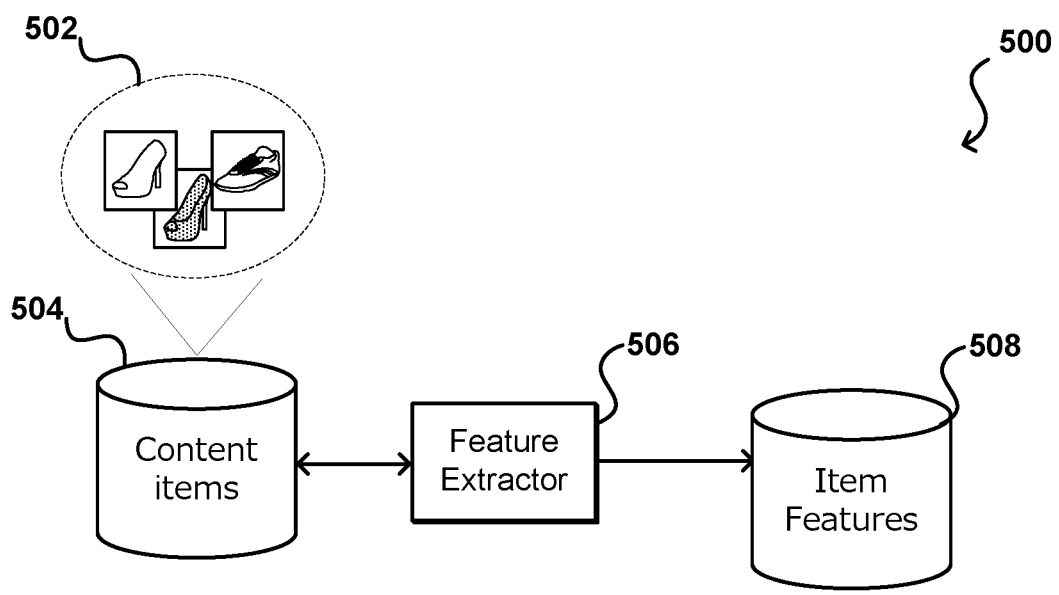
FIG. 5 illustrates an example technique of a preprocessing approach that can be utilized for visual searches in accordance with various embodiments of the present disclosure.

In order to create an electronic catalog of items that is searchable using three-dimensional features, the three-dimensional features of each item in the electronic catalog stored in a content repository (e.g., an electronic marketplace data repository) are identified and extracted from the image data of each item. For example, FIG. 5 illustrates an example technique 500 of a preprocessing approach for a visually similarity search, in accordance with various embodiments of the present disclosure. The electronic catalog of items may include image data, text descriptions, and other metadata associated with individual items in the electronic catalog. The items can be associated with a category including, for example, clothing, sofas, shoes, etc. A feature extractor 506 or other such model can be trained to extract three-dimensional features for items belonging to a particular category. Feature extractor 506 can be used to process images 502 of the items in the electronic catalog, stored in a content repository 504, to determine three-dimensional features representing the items in the catalog. The three-dimensional features can be stored in an appropriate data store, such as an item feature repository 508. As described, the feature extractor can be trained using three-dimensional representation information for an item in a category and images of various viewpoints of items in the category. The feature extractor or other such model can be trained for various categories of items. Thereafter, the feature extractor 506 can be used to process one or more query images for various viewpoints of an item to extract three-dimensional features of the item represented in those images. The three-dimensional features of items in the feature repository 508 can be used to select or rank the items in response to a search query that includes the query image(s).

Figure 6:
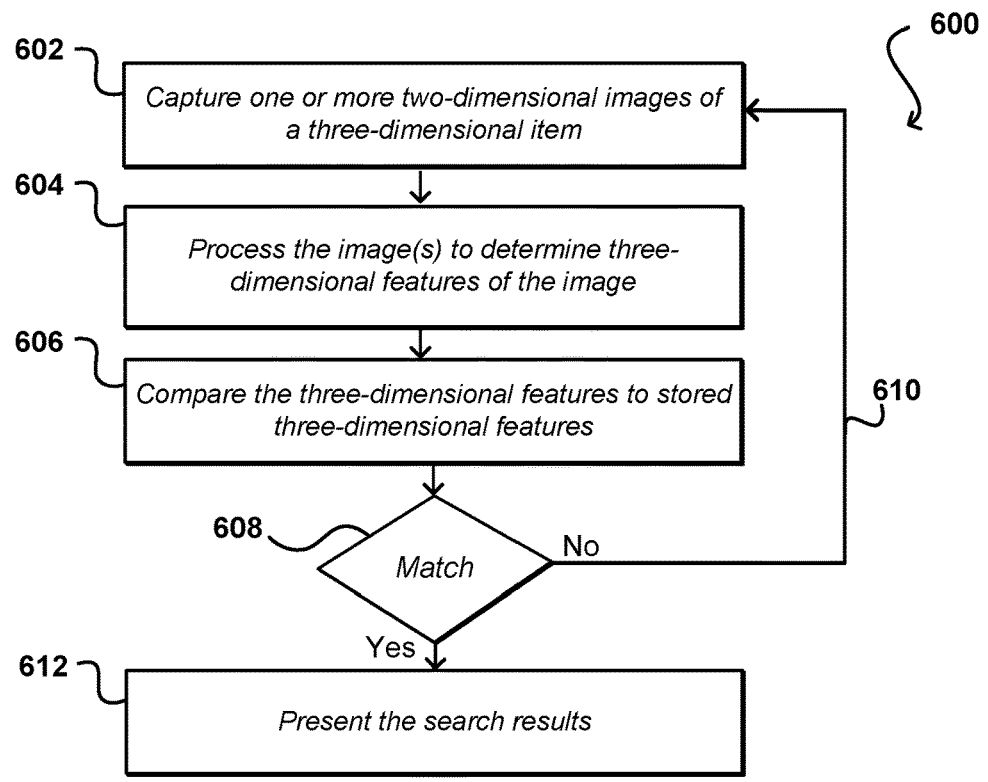
FIG. 6 illustrates an example process for a visual search in accordance with various embodiments of the present disclosure.

FIG. 6 illustrates an example process for a visual search in accordance with various embodiments of the present disclosure. It should be understood that, for any process discussed herein, there can be additional, fewer, or alternative steps performed in similar or alternative orders, or in parallel, within the scope of the various embodiments unless otherwise stated. In this example, an object identification process or application is activated on a computing device. The identification process can be activated manually by a user, such as by the user opening an application, or automatically by the device in response to a detected motion, location, or other such trigger. As discussed, an image can be captured manually or automatically, and the image can be analyzed on the device and/or on a remote system or service in communication with the device. An attempt can then be made to match the image, or data about the image, against stored images.

For example, a user can capture 602 one or more two-dimensional images, such as still images or image frames from a live video feed including a representation of a three-dimensional item. The two-dimensional image(s) can include various viewpoints of the item. The images can be associated with a visual search, for example. A trained neural network can process 604 the images to determine three-dimensional features (i.e., query three-dimensional features) from the images. As described, the query three-dimensional features can include a feature vector that includes information to construct a three-dimensional representation of the item. In this example, the query three-dimensional features can be used to search a database for visually similar items. For example, the database can include an electronic catalog of items offered through an electronic marketplace. The items can be associated with respective three-dimensional features. The three-dimensional features from the query image (i.e., the query three-dimensional features) can be compared 606 to the stored three-dimensional features that correspond to items offered through the electronic marketplace. Based on the comparison, a determination 608 can be made whether to present search results. If at least one match cannot be found with an acceptable level of confidence or other such metric, or if the results otherwise do not meet some predetermined criteria, the device can be caused to prompt 610 the user to capture additional images of the item or for additional information, such as a category, sub-category, type, or other such information about the item that might be helpful in locating an appropriate match. The process can continue until an acceptable match is located and/or a user indicates that one of the suggested matches is sufficient. In at least some embodiments, the user will only be prompted for additional information up to a maximum number of times, in order to prevent a degrading of the user experience, etc. If a match is determined, information for the results can be presented 612 as a set of matches or results in response to, for example, a visual search query. As discussed, information for related, similar, or suggested items or objects can be determined and presented as well. The search results can include an image of the matching item (as captured by the user or otherwise obtained), for example. Approaches can also utilize one or more information aggregators or other such services that are capable of obtaining additional information for each of the results and provide that information to the user. The additional information can include, for example, contact information, the name of the item, description information, review information, availability information, location information, pricing information, and other such information.

Figure 7:
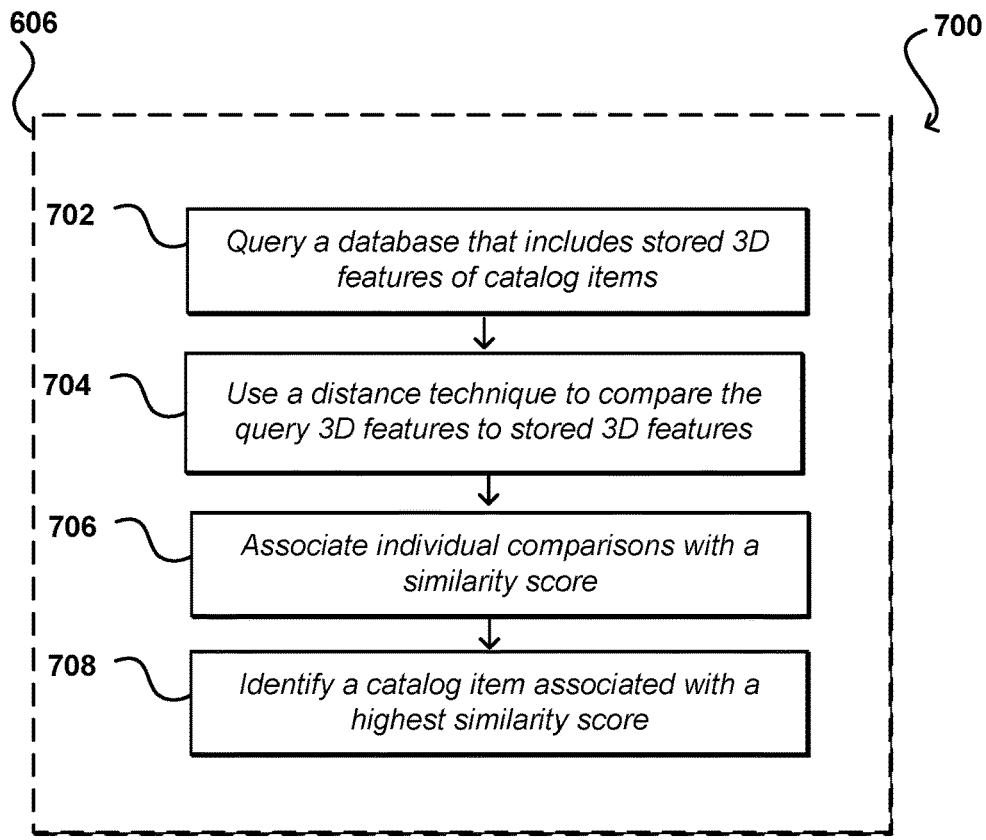
FIG. 7 illustrates an example process for determining visually similar items in accordance with various embodiments of the present disclosure.

FIG. 7 illustrates an example process 700 for comparing the three-dimensional features from the query image to the stored three-dimensional features can include a number of steps. In this example, once the three-dimensional features determined, either through performing feature extraction or obtaining stored features, a data base that includes stored three-dimensional features can be queried 702 to identify catalog items having three-dimensional features similar to the query three-dimensional features. Use 704 a distance technique to compare the query three-dimensional features to stored three-dimensional features of a plurality of catalog items. In an embodiment, the query three-dimensional features are compared to the stored three-dimensional features using a K-nearest neighbors (KNN) approach, which ranks the stored features based on similarity to the query feature. In some embodiments, the stored features may be ranked based on a "distance" between the query feature and each of the stored features, in which the shortest distance indicates a highest degree of similarity. Thus, a matching catalog item can be located as the item having three-dimensional features associated with the highest degree of similarity. In some embodiments, the similarity score is the rank position, the distance, or another measure derived from the rank or distance. A similarity score can be determined using the above-described technique for each stored item with respect to a category of items. In certain embodiments, there may be a similarity score threshold that stored items must meet in order to be considered or receive a ranking. In this example, individual comparisons can be associated 706 with a similarity score. In this example, a catalog item associated with a highest similarity score can be identified 708. It should be noted that one or more items may be identified, where the identified items includes a set of highest scoring items. Thereafter, search results that include the catalog item can be presented as matching the item in the visual search.

Figure 8:
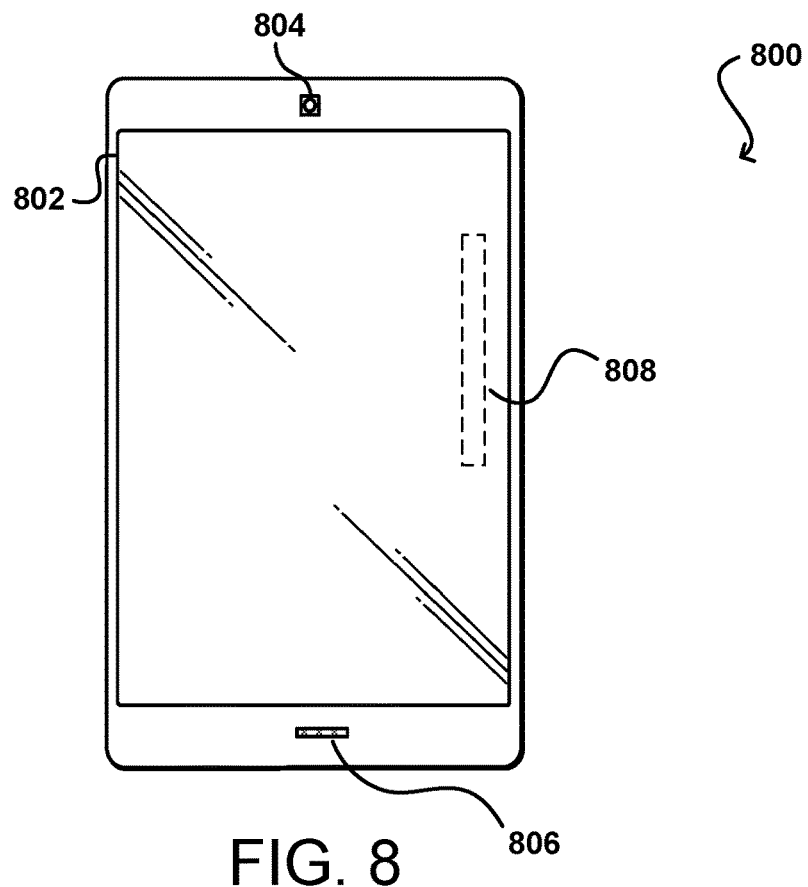
FIG. 8 illustrates an example computing device that can be used, in accordance with various embodiments of the present disclosure.

FIG. 8 illustrates an example computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, cameras, desktop computers, notebook computers, electronic book readers, personal data assistants, cellular phones, video gaming consoles or controllers, wearable computers (e.g., smart watches or glasses), television set top boxes, and portable media players, among others. In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like.

Figure 9:
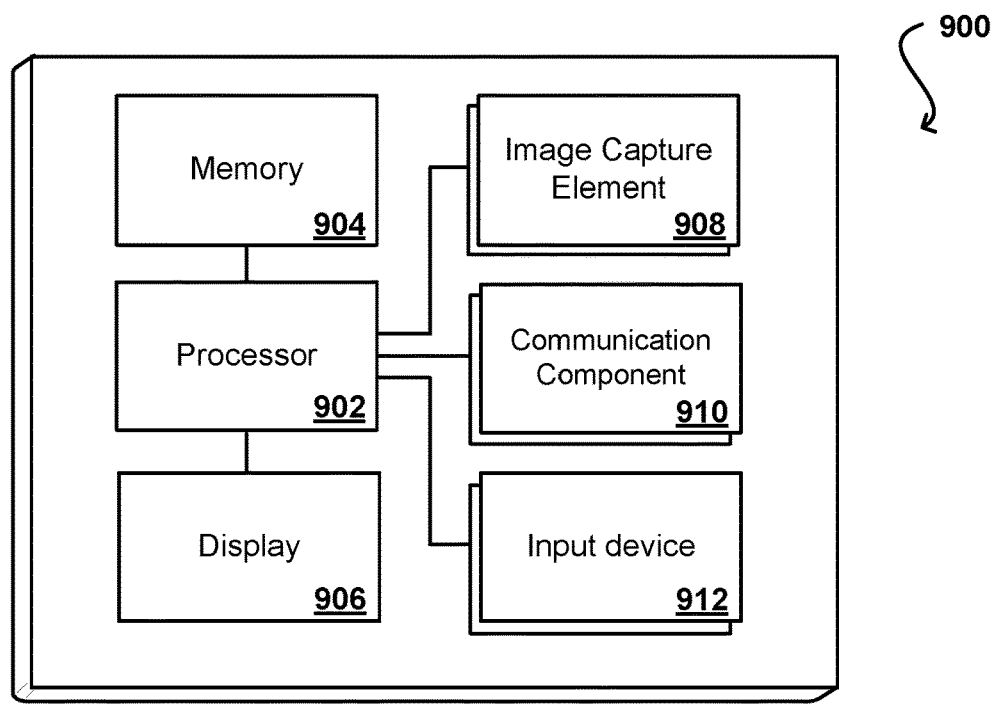
FIG. 9 illustrates a set of basic components of one or more devices of the present disclosure, in accordance with various embodiments of the present disclosure.

FIG. 9 illustrates a set of basic components of a computing device 900 such as the device 900 described with respect to FIG. 9. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may be enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10:
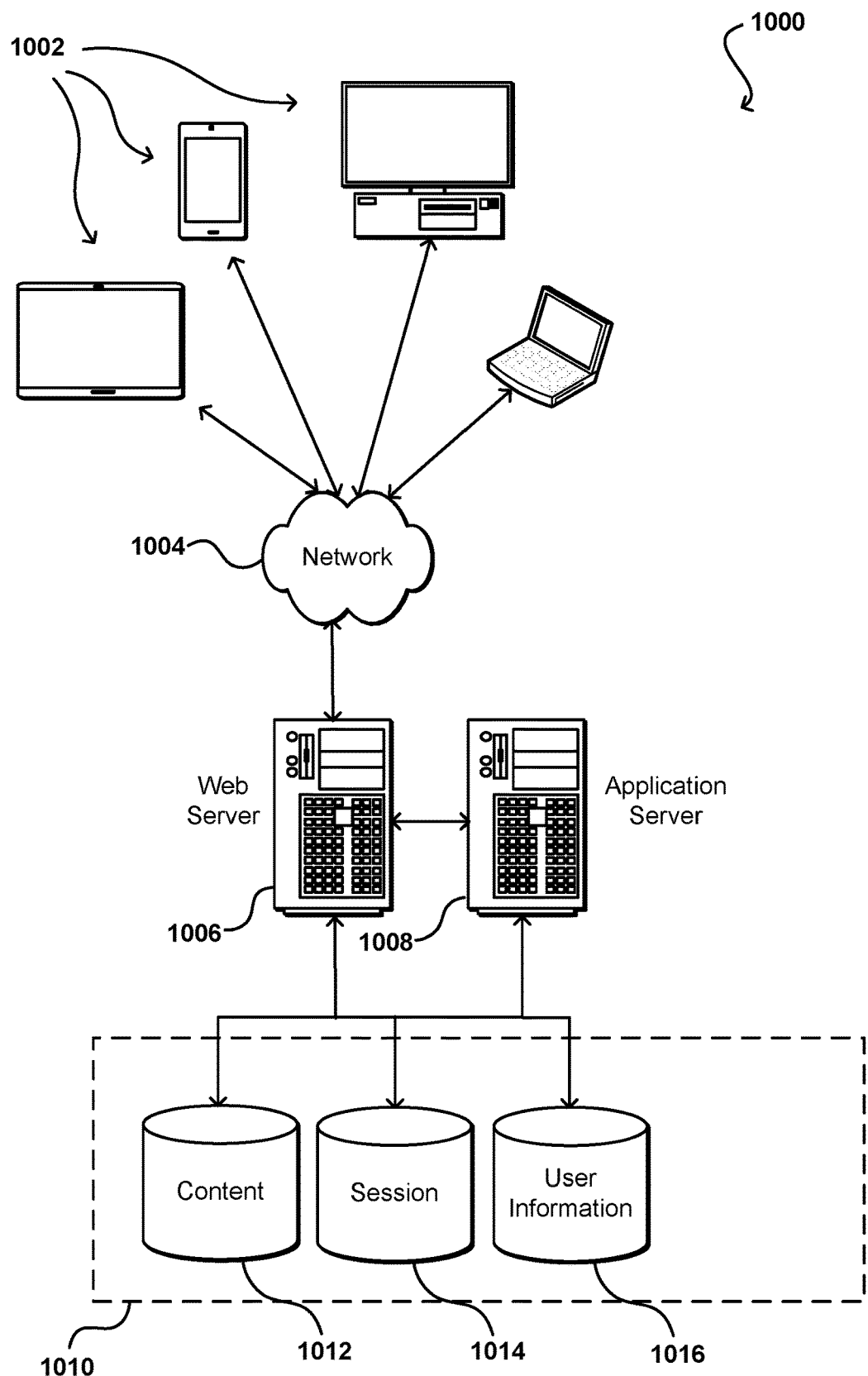
FIG. 10 illustrates an example environment for implementing aspects, in accordance with various embodiments of the present disclosure.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    obtaining a two-dimensional query image including a representation of a three-dimensional item;
    processing the two-dimensional query image using a trained model to determine three-dimensional features of the item, the trained model including at least one neural network configured to apply at least one three-dimensional feature extractor and generate three-dimensional feature data, the trained model further combining the three-dimensional feature data into a single representation and generating one or more three-dimensional models of the item;
    using the trained model to determine similarity scores between the one or more three-dimensional models of the item and three-dimensional feature data for a plurality of items, wherein the similarity scores are determined based on at least one of rank position, distance, or another measure derived from the rank position or distance;
    determining whether the similarity scores satisfy a threshold; and
    providing content, for display by an interface on a client device, for at least one item of the plurality based at least in part upon the similarity scores.

2. The computer-implemented method of claim 1, further comprising:
    obtaining three-dimensional representations of items in a category of items having item information stored in an electronic catalog, the three-dimensional representations generated using a plurality of images representative of the items from different viewpoints; and
    using the three-dimensional representations to train a convolutional neural network to generate the trained model, for the category of items, to generate three-dimensional feature information from image data that includes a two-dimensional representation of an item.

3. The computer-implemented method of claim 1, further comprising:
processing a catalog of images of items offered through an electronic marketplace using the trained model to determine the three-dimensional feature data; and
storing the three-dimensional feature data in a database associated with the electronic marketplace.

4. The computer-implemented method of claim 1, wherein the trained model is generated using a processing module and, and wherein the two-dimensional query image includes a first image having a first viewpoint of the item and a second image having a second viewpoint of the item, the method further comprising:
processing the first image and the second image using the processing module to determine respective first and second three-dimensional features.

5. The computer-implemented method of claim 4, further comprising:
processing the first three-dimensional features and the second three-dimensional features using a second trained model to combine the first three-dimensional features of the first viewpoint and the second three-dimensional features of the second viewpoint to generate combined three-dimensional features.

6. The computer-implemented method of claim 5, further comprising:
processing the combined three-dimensional features using at least one transform to reduce a number of dimensions of the combined three-dimensional features.

7. The computer-implemented method of claim 5, further comprising:
processing the combined three-dimensional features using a third trained model to determine a three-dimensional representation of the item.

8. The computer-implemented method of claim 7, further comprising:
comparing the three-dimensional representation of the item to a catalog three-dimensional feature data for the item to determine a similarity score; and
assigning a level of confidence to the trained model based at least in part upon on the similarity score.

9. The computer-implemented method of claim 1, wherein the two-dimensional query image is a first query image, the method further comprising:
determining a second query image including a second representation of the item from a second viewpoint; and
processing the first query image and the second query image using the trained model to determine combined three-dimensional features, wherein the similarity scores are based at least in part upon the combined three-dimensional features.

10. The computer-implemented method of claim 1, wherein the plurality of items include products offered through an electronic marketplace, and wherein the three-dimensional features of the query image correspond to a pose and a three-dimensional shape of the item.

11. The computer-implemented method of claim 1, wherein the two-dimensional query image is uploaded from the client device, captured using a camera of the client device, or pointed to via a link provided from the client device, and wherein the two-dimensional query image includes at least one viewpoint of the item.

12. The computer-implemented method of claim 1, further comprising:
wherein the similarity scores are further determined based on K-nearest neighbor distances or rankings positions.

13. A system, comprising:
at least one computing device processor; and
a memory device including instructions that, when executed by the at least one computing device processor, cause the system to:
obtain a two-dimensional query image including a representation of a three-dimensional item;
process the two-dimensional query image using a trained model to determine three-dimensional features of the item, the trained model including at least one neural network configured to apply at least one three-dimensional feature extractor and generate three-dimensional feature data, the trained model further combining the three-dimensional feature data into a single representation and generating one or more three-dimensional models of the item;
use the trained model to determine similarity scores between the one or more three-dimensional models of the item and three-dimensional feature data for a plurality of items, wherein the similarity scores are determined based on at least one of rank position, distance, or another measure derived from the rank position or distance;
determine whether the similarity scores satisfy a threshold; and
provide content, for display by an interface on a client device, for at least one item of the plurality based at least in part upon the similarity scores.

14. The system of claim 13, wherein the instructions when executed further cause the system to:
obtain three-dimensional representations of items in a category of items having item information stored in an electronic catalog, the three-dimensional representations generated using a plurality of images representative of the items from different viewpoints; and
use the three-dimensional representations to train a convolutional neural network to generate the trained model, for the category of items, to generate three-dimensional feature information from image data that includes a two-dimensional representation of an item.

15. The system of claim 14, wherein the instructions when executed further cause the system to:
process a catalog of images of items offered through an electronic marketplace using the trained model to determine the three-dimensional feature data; and
store the three-dimensional feature data in a database associated with the electronic marketplace.

16. The system of claim 13, wherein the trained model is generated using a processing module, and wherein the two-dimensional query image includes a first image having a first viewpoint of the item and a second image having a second viewpoint of the item, and wherein the instructions when executed further cause the system to:
process the first image and the second image using the processing module to determine respective first and second three-dimensional features.

17. The system of claim 16, wherein the instructions when executed further cause the system to:
process the first three-dimensional features and the second three-dimensional features using a second trained model to combine the first three-dimensional features of the first viewpoint and the second three-dimensional features of the second viewpoint to generate combined three-dimensional features.

18. The system of claim 13, wherein the instructions when executed further cause the system to:

further determine the similarity scores based on K-nearest neighbor distances or rankings positions.

\* \* \* \* \*